United States Patent
Harvey et al.

(10) Patent No.: US 11,871,505 B2
(45) Date of Patent: Jan. 9, 2024

(54) AUTOMATED LINE TESTING

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 514 days.

(21) Appl. No.: 17/151,337

(22) Filed: Jan. 18, 2021

(65) Prior Publication Data

US 2022/0070293 A1    Mar. 3, 2022

Related U.S. Application Data

(60) Provisional application No. 63/070,460, filed on Aug. 26, 2020.

(51) Int. Cl.
*H05K 7/14*  (2006.01)
*G06F 8/51*  (2018.01)
(Continued)

(52) U.S. Cl.
CPC ............ *H05K 7/1465* (2013.01); *F24F 11/32* (2018.01); *F24F 11/49* (2018.01); *F24F 11/63* (2018.01);
(Continued)

(58) Field of Classification Search
CPC .. H05K 7/1465; H05K 7/1477; H05K 7/1481; H05K 7/1468; H04W 4/80; F24F 11/32; F24F 11/63; F24F 11/88; F24F 11/49; G06F 3/04186; G06F 2115/12; G06F 30/18; G06F 30/13; G06F 30/12; G01R 31/55; H04L 67/75; G05B 13/0265; G05B 15/02; G05B 19/048; G05B 23/0216; G05B 23/0264; G05B 23/0272
See application file for complete search history.

(56) References Cited

U.S. PATENT DOCUMENTS 4,353,653 A   10/1982  Zimmerman
5,208,765 A    5/1993  Turnbull
(Continued)

FOREIGN PATENT DOCUMENTS

CN    103926912 B    5/2014
CN    206002869 U    8/2016
(Continued)

OTHER PUBLICATIONS

Gou, Wendy et al., "Wireless mesh networks in intelligent building automation control: a survey." International Journal of Intelligent Control and Systems, vol. 16, No. 1, Mar. 2011, 28-36.
(Continued)

*Primary Examiner* — Khanh C Tran

(57) ABSTRACT

Tools and techniques are described to automate line testing when wiring devices (such as equipment and sensors) to controllers. Controllers have access to databases of the devices that are controlled by them, including wiring diagrams and protocols, such that the controller can automatically check that each wire responds correctly to stimulus from the controller. After testing, a reporting device rapidly shows the results of the line testing.

20 Claims, 11 Drawing Sheets

(51) Int. Cl.

| | | |
|---|---|---|
| *G06F 3/041* | (2006.01) | |
| *G05B 19/048* | (2006.01) | |
| *H04M 3/30* | (2006.01) | |
| *G05B 15/02* | (2006.01) | |
| *G06F 3/04847* | (2022.01) | |
| *G06F 3/147* | (2006.01) | |
| *G05B 23/02* | (2006.01) | |
| *H02J 3/00* | (2006.01) | |
| *F24F 11/63* | (2018.01) | |
| *H04W 4/80* | (2018.01) | |
| *G06F 30/13* | (2020.01) | |
| *G06F 30/12* | (2020.01) | |
| *G06F 3/0482* | (2013.01) | |
| *H04L 67/125* | (2022.01) | |
| *G06F 30/18* | (2020.01) | |
| *G06F 8/41* | (2018.01) | |
| *G06F 8/53* | (2018.01) | |
| *G06F 8/74* | (2018.01) | |
| *F24F 11/32* | (2018.01) | |
| *F24F 11/88* | (2018.01) | |
| *F24F 11/49* | (2018.01) | |
| *G05B 13/02* | (2006.01) | |
| *H04L 67/12* | (2022.01) | |
| *G06F 1/3209* | (2019.01) | |
| *G06F 1/3246* | (2019.01) | |
| *G06F 9/4401* | (2018.01) | |
| *H04W 84/00* | (2009.01) | |
| *G06Q 30/0283* | (2023.01) | |
| *H04B 3/46* | (2015.01) | |
| *H04L 43/50* | (2022.01) | |
| *H04L 67/75* | (2022.01) | |
| *G01R 31/55* | (2020.01) | |
| *G06F 30/392* | (2020.01) | |
| *G06F 113/04* | (2020.01) | |
| *G06F 115/12* | (2020.01) | |
| *G06F 111/04* | (2020.01) | |
| *G06F 111/16* | (2020.01) | |
| *G06F 113/16* | (2020.01) | |

(52) U.S. Cl.
CPC ............. *F24F 11/88* (2018.01); *G01R 31/55* (2020.01); *G05B 13/0265* (2013.01); *G05B 15/02* (2013.01); *G05B 19/048* (2013.01); *G05B 23/0216* (2013.01); *G05B 23/0264* (2013.01); *G05B 23/0272* (2013.01); *G06F 1/3209* (2013.01); *G06F 1/3246* (2013.01); *G06F 3/0482* (2013.01); *G06F 3/04186* (2019.05); *G06F 3/04847* (2013.01); *G06F 3/147* (2013.01); *G06F 8/436* (2013.01); *G06F 8/51* (2013.01); *G06F 8/53* (2013.01); *G06F 8/74* (2013.01); *G06F 9/4418* (2013.01); *G06F 30/12* (2020.01); *G06F 30/13* (2020.01); *G06F 30/18* (2020.01); *G06Q 30/0283* (2013.01); *H02J 3/00* (2013.01); *H04B 3/46* (2013.01); *H04L 43/50* (2013.01); *H04L 67/12* (2013.01); *H04L 67/125* (2013.01); *H04L 67/75* (2022.05); *H04M 3/305* (2013.01); *H04W 4/80* (2018.02); *H04W 84/00* (2013.01); *H05K 7/1468* (2013.01); *H05K 7/1477* (2013.01); *H05K 7/1481* (2013.01); *G06F 30/392* (2020.01); *G06F 2111/04* (2020.01); *G06F 2111/16* (2020.01); *G06F 2113/04* (2020.01); *G06F 2113/16* (2020.01); *G06F 2115/12* (2020.01); *H02J 2310/12* (2020.01)

(56) References Cited

U.S. PATENT DOCUMENTS

| | | |
|---|---|---|
| 5,530,643 A | 6/1996 | Hodorowski |
| 6,275,962 B1 | 8/2001 | Fuller et al. |
| 6,301,341 B1 | 10/2001 | Gizara et al. |
| 6,349,235 B1 | 2/2002 | Gibart et al. |
| 6,437,692 B1 | 8/2002 | Petite et al. |
| 6,606,731 B1 | 8/2003 | Baum et al. |
| 6,645,066 B2 | 11/2003 | Gutta et al. |
| 6,813,777 B1 | 11/2004 | Weinberger et al. |
| 6,891,838 B1 | 5/2005 | Petite et al. |
| 7,102,502 B2 | 9/2006 | Autret |
| 7,304,855 B1 | 12/2007 | Milligan et al. |
| 7,578,135 B2 | 8/2009 | Mattheis |
| 7,587,250 B2 | 9/2009 | Coogan et al. |
| 7,729,882 B2 | 6/2010 | Seem |
| 7,734,572 B2 | 6/2010 | Wiemeyer et al. |
| 7,835,431 B2 | 11/2010 | Belge |
| 7,865,629 B1 | 1/2011 | Tantos et al. |
| 7,917,232 B2 | 3/2011 | McCoy et al. |
| 8,024,054 B2 | 9/2011 | Mairs et al. |
| 8,099,178 B2 | 1/2012 | Mairs et al. |
| 8,503,183 B2 * | 8/2013 | Hamilton ............. H05K 5/0017 361/728 |
| 8,503,943 B2 | 8/2013 | Spanhake |
| 8,628,239 B2 | 1/2014 | Merrow et al. |
| 8,643,476 B2 | 2/2014 | Pinn et al. |
| 8,749,959 B2 | 6/2014 | Riley et al. |
| 8,782,619 B2 | 7/2014 | Wu et al. |
| 8,925,358 B2 | 1/2015 | Kasper |
| 9,441,847 B2 | 9/2016 | Grohman |
| 9,521,724 B1 | 12/2016 | Berry et al. |
| 9,544,209 B2 | 1/2017 | Gielarowski et al. |
| 9,602,301 B2 | 3/2017 | Averitt |
| 9,664,400 B2 | 5/2017 | Wroblewski et al. |
| 9,678,494 B2 | 6/2017 | Hyde et al. |
| 9,740,385 B2 | 8/2017 | Fadell et al. |
| 9,791,872 B2 | 10/2017 | Wang et al. |
| 9,857,238 B2 | 1/2018 | Malhotra et al. |
| 9,860,961 B2 | 1/2018 | Chemel et al. |
| 9,952,573 B2 | 4/2018 | Sloo et al. |
| 10,042,730 B2 | 8/2018 | Zebian |
| 10,094,586 B2 | 10/2018 | Pavlovski et al. |
| 10,223,721 B1 | 3/2019 | Bhatia |
| 10,334,758 B1 | 6/2019 | Ramirez et al. |
| 10,512,143 B1 | 12/2019 | Ikehara et al. |
| 10,528,016 B2 | 1/2020 | Noboa |
| 10,557,889 B2 | 2/2020 | Montoya et al. |
| 10,558,183 B2 | 2/2020 | Piaskowski et al. |
| 10,558,248 B2 | 2/2020 | Adrian |
| 10,627,124 B2 | 4/2020 | Walser et al. |
| 10,640,211 B2 | 5/2020 | Whitten et al. |
| 10,672,293 B2 | 6/2020 | Abutov et al. |
| 10,687,435 B2 | 6/2020 | Adrian et al. |
| 10,736,228 B2 * | 8/2020 | Kho ..................... G11B 33/142 |
| 10,892,946 B2 | 1/2021 | Correia e Costa et al. |
| 10,900,489 B2 | 1/2021 | Rendusara et al. |
| 10,942,871 B2 | 3/2021 | Cawse et al. |
| 10,943,444 B2 | 3/2021 | Boyd et al. |
| 10,966,068 B2 | 3/2021 | Tramiel et al. |
| 10,966,342 B2 | 3/2021 | Lairsey et al. |
| 10,969,133 B2 | 4/2021 | Harvey |
| 11,088,989 B2 | 8/2021 | Gao et al. |
| 11,229,138 B1 * | 1/2022 | Harvey ................ H05K 7/1468 |
| 11,294,254 B2 | 4/2022 | Patterson et al. |
| 2004/0236547 A1 | 11/2004 | Rappaport et al. |
| 2005/0040247 A1 | 2/2005 | Pouchak |
| 2007/0096902 A1 | 5/2007 | Seeley et al. |
| 2007/0162288 A1 | 7/2007 | Springhart et al. |
| 2008/0222584 A1 | 9/2008 | Habib et al. |
| 2008/0270951 A1 | 10/2008 | Anand et al. |
| 2008/0277486 A1 | 11/2008 | Seem et al. |
| 2009/0189764 A1 | 7/2009 | Keller et al. |
| 2010/0005218 A1 | 1/2010 | Gower et al. |
| 2010/0025483 A1 | 2/2010 | Hoeynck et al. |
| 2010/0131933 A1 | 5/2010 | Kim et al. |
| 2010/0162037 A1 | 6/2010 | Maule et al. |

(56) References Cited

U.S. PATENT DOCUMENTS

| | | |
|---|---|---|
| 2010/0237891 A1 | 9/2010 | Lin et al. |
| 2011/0087988 A1 | 4/2011 | Ray et al. |
| 2011/0125930 A1 | 5/2011 | Tantos et al. |
| 2012/0102472 A1 | 4/2012 | Wu et al. |
| 2012/0221986 A1 | 8/2012 | Whitford et al. |
| 2013/0343207 A1 | 12/2013 | Cook et al. |
| 2013/0343388 A1 | 12/2013 | Stroud et al. |
| 2013/0343389 A1 | 12/2013 | Stroud et al. |
| 2013/0343390 A1 | 12/2013 | Moriarty et al. |
| 2013/0346987 A1 | 12/2013 | Raney et al. |
| 2014/0088772 A1 | 3/2014 | Elkens |
| 2014/0101082 A1 | 4/2014 | Matsuoka et al. |
| 2014/0215446 A1 | 7/2014 | Araya et al. |
| 2014/0277757 A1 | 9/2014 | Wang et al. |
| 2014/0280960 A1* | 9/2014 | Paramasivam ....... G06F 9/4413 709/226 |
| 2014/0358291 A1 | 12/2014 | Wells |
| 2014/0364985 A1 | 12/2014 | Tiwari et al. |
| 2015/0081928 A1 | 3/2015 | Wintzell et al. |
| 2015/0198938 A1 | 7/2015 | Steele et al. |
| 2015/0234381 A1 | 8/2015 | Ratilla et al. |
| 2016/0016454 A1 | 1/2016 | Yang et al. |
| 2016/0062753 A1 | 3/2016 | Champagne |
| 2016/0073521 A1 | 3/2016 | Marcade et al. |
| 2016/0086242 A1 | 3/2016 | Schafer et al. |
| 2016/0092427 A1 | 3/2016 | Bittmann |
| 2016/0132308 A1 | 5/2016 | Muldoon |
| 2016/0195856 A1 | 7/2016 | Spero |
| 2016/0205784 A1 | 7/2016 | Kyle et al. |
| 2016/0209868 A1* | 7/2016 | Hartman ................ G06F 1/181 |
| 2016/0285715 A1 | 9/2016 | Gielarowski et al. |
| 2016/0295663 A1 | 10/2016 | Hyde et al. |
| 2016/0088438 A1 | 12/2016 | O'Keeffe |
| 2017/0075323 A1 | 3/2017 | Shrivastava et al. |
| 2017/0097259 A1 | 4/2017 | Brown et al. |
| 2017/0131611 A1 | 5/2017 | Brown et al. |
| 2017/0149638 A1 | 5/2017 | Gielarowski et al. |
| 2017/0169075 A1 | 6/2017 | Jiang et al. |
| 2017/0176034 A1 | 6/2017 | Hussain et al. |
| 2017/0322579 A1 | 11/2017 | Goparaju et al. |
| 2017/0365908 A1 | 12/2017 | Hughes et al. |
| 2018/0005195 A1 | 1/2018 | Jacobson |
| 2018/0075168 A1 | 3/2018 | Tiwari et al. |
| 2018/0089172 A1 | 3/2018 | Needham |
| 2018/0123272 A1* | 5/2018 | Mundt ............... H01R 13/6471 |
| 2018/0202678 A1 | 7/2018 | Ahuja et al. |
| 2018/0266716 A1 | 9/2018 | Bender et al. |
| 2018/0307781 A1 | 10/2018 | Byers et al. |
| 2019/0087076 A1 | 4/2019 | Dey et al. |
| 2019/0138704 A1 | 5/2019 | Shrivastava et al. |
| 2019/0156443 A1 | 5/2019 | Idle |
| 2019/0173109 A1 | 6/2019 | Wang |
| 2019/0294018 A1 | 9/2019 | Shrivastava et al. |
| 2020/0003444 A1 | 1/2020 | Yuan et al. |
| 2020/0018506 A1 | 1/2020 | Ruiz et al. |
| 2020/0050161 A1 | 2/2020 | Noboa |
| 2020/0133257 A1 | 4/2020 | Cella et al. |
| 2020/0150508 A1 | 5/2020 | Patterson et al. |
| 2020/0167442 A1 | 5/2020 | Roecker et al. |
| 2020/0187147 A1 | 6/2020 | Meerbeek et al. |
| 2020/0221269 A1 | 7/2020 | Tramiel et al. |
| 2020/0226223 A1 | 7/2020 | Reichl |
| 2020/0228759 A1 | 7/2020 | Ryan et al. |
| 2020/0255142 A1 | 8/2020 | Whitten et al. |
| 2020/0279482 A1 | 9/2020 | Berry et al. |
| 2020/0287786 A1 | 9/2020 | Anderson et al. |
| 2020/0288558 A1 | 9/2020 | Anderson et al. |
| 2020/0342526 A1 | 10/2020 | Ablanczy |
| 2020/0379730 A1 | 12/2020 | Graham et al. |
| 2020/0387041 A1 | 12/2020 | Shrivastava et al. |
| 2020/0387129 A1 | 12/2020 | Chandaria |
| 2021/0073441 A1 | 3/2021 | Austern et al. |
| 2021/0081504 A1 | 3/2021 | Mccormick et al. |
| 2021/0081880 A1 | 3/2021 | Bivins et al. |
| 2021/0157312 A1 | 5/2021 | Cella et al. |
| 2021/0182660 A1 | 6/2021 | Amirguliyev et al. |
| 2021/0366793 A1 | 11/2021 | Hung et al. |
| 2021/0383041 A1 | 12/2021 | Harvey et al. |
| 2021/0400787 A1 | 12/2021 | Abbo et al. |
| 2022/0066722 A1* | 3/2022 | Harvey ................. G05B 15/02 |
| 2022/0069863 A1 | 3/2022 | Harvey |
| 2022/0070293 A1 | 3/2022 | Harvey et al. |

FOREIGN PATENT DOCUMENTS

| | | |
|---|---|---|
| CN | 206489622 U | 9/2017 |
| CN | 206489622 U | 9/2017 |
| JP | 6301341 B2 | 3/2018 |
| WO | 2008016500 A3 | 3/2008 |
| WO | WO2012019328 A1 | 2/2012 |
| WO | 2014025511 A1 | 2/2014 |

OTHER PUBLICATIONS

Kastner, Wolfgang, et al., "Building Automation System Integration into the Internet of Things, The IoT6 Approach, Its Realization and Validation," Proceedings of the 2014 IEEE Emerging Technology and Factory Automation (ETFA), IEEE, 2014, pp. 1-9 (Year:2014).

Shailendra, Eshan et al., "Analyzing home automation and networking technologies," IEEE Potentials 37.1 (2018): pp. 27-33, (Year 2018).

BigLadder Software Full Ref, Occupant Thermal Comfort: Engineering Reference, 2014, The Board of Trustees of the University of Illinois and the Regents of the University of California through the Ernest Orlando Lawrence Berkeley National Laboratory (Year: 2014).

Hagentoft et al. Full Reference, Assessment Method of Numerical Prediction Models for Combined Heat, Air and Moisture Transfer in Building Components: Benchmarks for One-dimensional Cases, Journal of Thermal Env. & Bldg. Sci., vol. 27, No. 4, Apr. 2004.

U.S. Appl. No. 15/995,019 (7340.2.2) Office Action dated Jul. 26, 2019.

U.S. Appl. No. 15/995,019 (7340.2.2) Office Action dated Oct. 8, 2020.

U.S. Appl. No. 15/995,019 (7340.2.2) Office Action dated Apr. 15, 2020.

de Meester et al., SERIF:A Semantic ExeRcise Interchange FormatConference: Proceedings of the 1st International Workshop on LINKed EDucation, Oct. 2015.

Kalagnanam et al., "A System For Automated Mapping of Bill-of_Materials Part Numbers", KDD '04: Proceedings of the tenth ACM SIGKDD international conference on Knowledge discovery and data mining, Aug. 2004, p. 805-810.

Mouser Electronics News Release, Aug. 16, 2018.

Ouf et al., Effectiveness of using WiFi technologies to detect and predict building occupancy, Sust. Buildi. 2, 7 (2017).

Radiomaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi: 10.3390, Mar. 12, 2018.

Siano, P, "Demand response and smart grids—A survey", Renewable and Sustainable Energy Reviews 30 (2014) 461-478.

Yegulap, Serdar, "What is LLVM? The power behind Swift, Rust, Clang, and more," Infoworld, Mar. 11, 2020.

Wang et al., "A Practical Multi-Sensor Cooling Demand Estimation Approach Based on Visual Indoor and Outdoor Information Sensing," Sensors 2018, 18, 3591; doi: 10.3390.

Amin, Massoud, "Toward self-healing energy infrastructure systems," IEEE Computer Applications in Power 14.1 (2002): pp. 20-28.

Gou, Wenqi, and Mengchu Zhou, "An emerging technology for improved building automation control," 2009, IEEE International Conference on Systems, Man and Cybernetics, IEEE, 2009, pp. 337-342.

(56) References Cited

OTHER PUBLICATIONS

Gungor et al., "Industrial Wireless Sensor Networks: Challenges, Design Principles, and Technical Approaches," IEEE Transactions on Industrial Electronics, vol. 56, No. 10, Oct. 2009.

* cited by examiner

AUTOMATED LINE TESTING

RELATED APPLICATION

The present application hereby incorporates by reference the entirety of, and claims priority to, U.S. Provisional Patent Application Ser. No. 63/070,460 filed 26 Aug. 2020.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to line testing device connections to controllers. More specifically, to automatically determining if a correct device line is connected to a controller.

BACKGROUND

Today's "smart buildings" aren't smart at all—just connected. Expensive cloud add-ons that promise to "un-dumb" your control system can only provide low-value results and reduced reliability, all at the cost of more integration effort. Wiring diagrams take hours to create. Further, if a problem comes up when building a structure that requires that a wired device must be moved, the wiring diagram must be recreated from scratch, which can entail quite a bit of effort. When wiring diagrams are changed, the terminals that the devices are to be wired to may also need to be changed as well, which also may entail completely redoing the wiring diagrams from scratch.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, some technologies described herein describe a controller system equipped with automated line testing technology. This is used to determine if a device wire attached to a wiring pin on the controller matches the device that the controller expects at that location. The controller comprises a processor, a memory, a database of proposed device-controller locations, a database of device layouts, the device layouts comprising wiring pin layout. To determine if the correct device is attached to a controller, the controller detects that a device wire has been attached to it. The controller determines what device is supposed to be attached at that location, possibly using a database stored in the controller.

The controller has access to information about the wiring of the proposed device, such as what protocol is supposed to be run, what current is expected to be on the wire at certain times, what voltage is supposed to be on the wire at certain times, what protocol is supposed to be used by the device to send and receive messages from the controller, etc. Using this information, the controller determines what information is being sent on the wire and if that information matches up with what it expects. The validity (if the device wire is the correct device or not) is then reported. In some embodiments, if the device is the one that the controller expects, then the validity is true. If the device wire is not the one that the controller has recorded that is supposed to be attached at that location, then the validity is false.

Some innovative embodiments are directed to automatic line testing which allows a user to insert a wire in a module associated with a controller, and a light on the module associated with the wire terminal insertion location indicates that the correct wire has been inserted. Some embodiment may indicate that an incorrect wire has been inserted. In some implementations, the device may need a different sort of wire terminal insertion location, in which case, in some implementations, the controller may be able to direct the module to change wire terminal insertion types to match the type needed by the device.

DETAILED DESCRIPTION

Disclosed below are representative embodiments of methods, computer-readable media, and systems having particular applicability to automated line testing. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages.

I. Overview

When originally designing and building a structure, the creation process can include designing the structure using a portion of the controller system that will eventually control the various devices (such as HVAC equipment, sensors, safety systems, etc.). In such a system, the specific wiring details and other characteristics about the devices will be input into the controller system during the design process. The wiring diagram for the building can then be created by the controller system. This wiring diagram can comprise the specific wiring diagram for each controller in the building. The specific wiring diagram can include the wiring pin(s) in a controller that a device will be attached to. When a device and its details are input into the original design, the controller already then knows enough about the device to be able to run it properly. Thus, the controller automatically knows what devices were wired to which locations, and what their specifications are, down to their wiring requirements. Thus, when a device is physically being wired to a controller during the building process, the controller can tell if the correct wire of the device is being attached to the correct spot on the controller.

The technical character of embodiments described herein will be apparent to one of ordinary skill in the art, and will also be apparent in several ways to a wide range of attentive readers. Some embodiments address technical activities that are rooted in computing technology, such as more quickly and efficiently constructing electrical, HVAC, etc. systems, etc. Further, because the controller system itself knows the devices that are attached and their protocols, this information is automatically historically archived. Other advantages based on the technical characteristics of the teachings will also be apparent to one of skill from the description provided.

Figure 1:
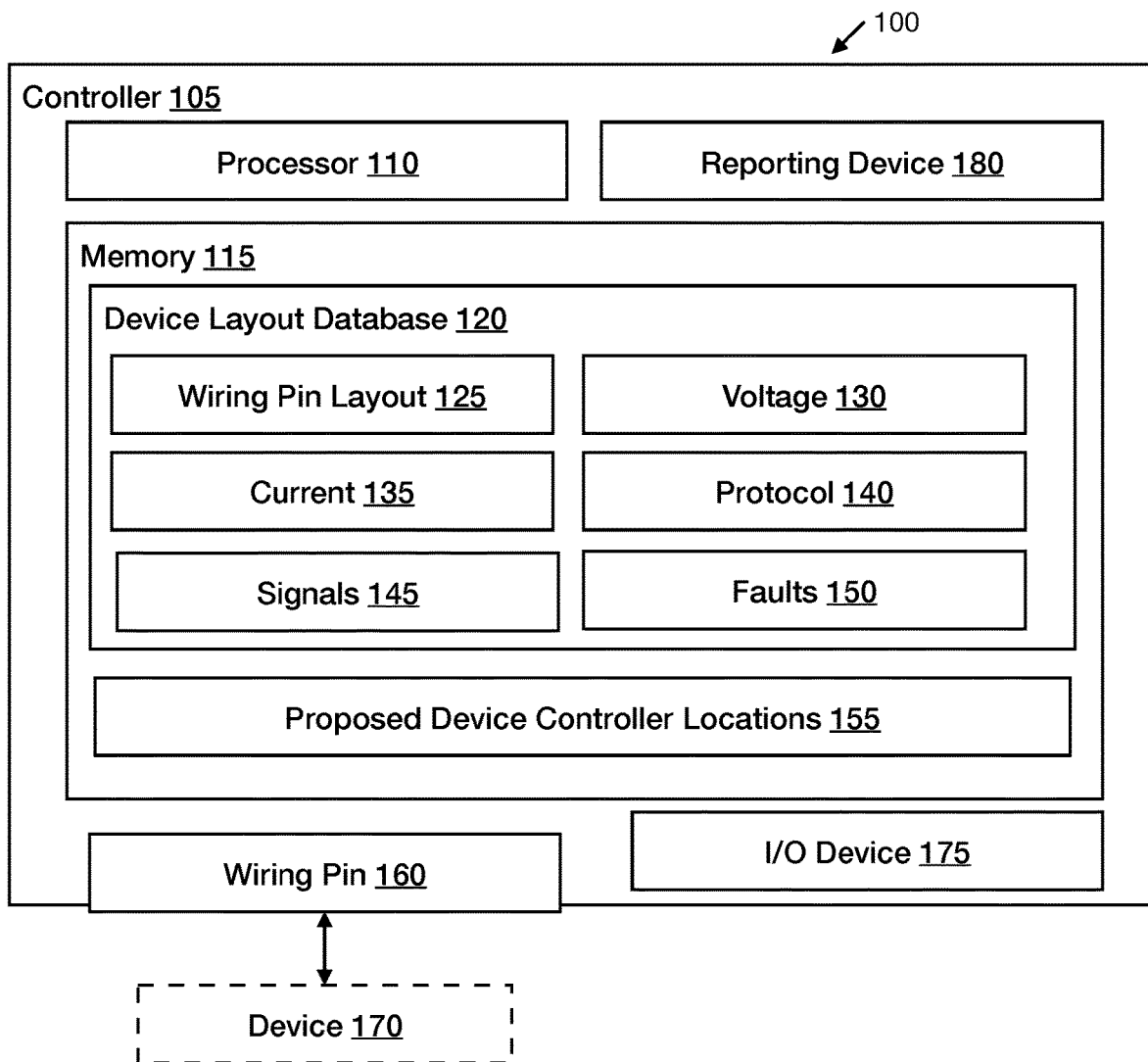
FIG. 1 is a functional block diagram showing an exemplary embodiment of a controller in conjunction which some described embodiments can be implemented.

FIG. 1 illustrates aspects of a system architecture which is suitable for use with some automatic line testing embodiments. A system 100 to allow automated point mapping line testing is disclosed. The system 100 includes a controller 105 which comprises computer processor 110, memory 115, and a wiring pin 160 that can be used to automatically line test devices 170 wired to the controller 105. The memory 115 can be any appropriate volatile or non-volatile storage subsystem. For example, the external memory can be volatile memory, e.g., static memory cells, as in FPGAs and some CPLDs; or non-volatile memory, e.g., FLASH memory, as in some CPLDs, or in any other appropriate type of memory cell. The wiring pin 160 comprises a connector between the controller 105 and a device, such that the device can be wired to the controller and the controller can then pass messages to the device and receive messages from the device. Examples of such messages are "turn on," "turn off," "turn on low," "determine how much power is being drawn," and so on. The wiring pin is any sort of connector that can pass information to a device, from a device, or to and from a device. For example, the wiring pin may be a terminal contact such as a pogo connecter. The wiring pin 160 may be a part of a module that is itself connected to the controller 105.

Figure 4:
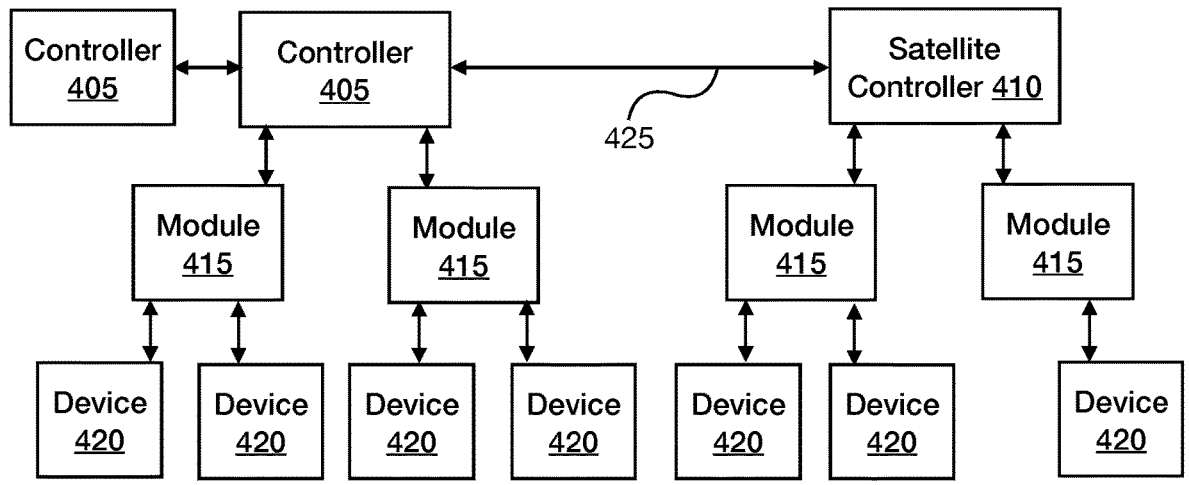
FIG. 4 is an exemplary flow chart illustrating steps in some methods of automated point mapping generation with which some described embodiments may be implemented.

The memory 115 has stored in it a device layout database 120 which itself comprises a wiring pin layout 125 (e.g., describing which pins are expected to be attached to which devices, and which pin of each device attaches where). The controller, through the device layout database and other associated databases, also understands the nature of each of the devices that are to be attached to it—the protocol—such that it also has stored in memory at least one of a current 135 expected for a pin that is to be attached to a device, a voltage 130, the protocol 140 that the device is running, e.g., a standard set of signals that the controller can expect to receive from the device, and what signals the device expects back. Some devices may have an idiosyncratic signal set, or a single signal 145 that may also be stored. Some controllers or devices also have a database of faults 150 that may be associated with devices or with other controller features, such as network connections. Even though items 125-150 are listed in the device layout database, this is for convenience only; they can be stored in separate databases, etc. Protocol should be understood as a broad term encompassing open protocols such as BACnet, closed protocols, such as SNA, protocols for individual pieces of equipment, such as whether they are analog, the voltage allowances, e.g., 0-10 volts, a single value such as 40 milliamps or 12 volts; the signals that a specific piece of equipment uses to communicate with a controller, such as on/off values, current, voltage, networkable protocol, modulation, frequency, any combination of the above, etc. The controller memory The device layout database can take many forms, as understood by those of skill in the art. With reference to FIG. 4, an example device layout is shown. In a database, (such as one that may be stored in memory 115) controllers (such as that shown at 410) has connections to modules 415 that are at specific locations within the controller. Each of these modules has connections to devices 420 that are at specific locations within the modules. The devices may have wiring information stored about them in memory associated with the controller; everything may have location within a structure stored with it, also. These devices may be any sort of device that can be wired to a controller, such as HVAC devices, sensors, entertainment systems, security systems, irrigation systems, and so forth. In some implementations, with multiple controllers, a master controller may store all the device layout database information 120; in other implementations the device layout database 120 may be distributed between multiple controllers. In some implementations, a satellite controller 410 can fit modules associated with devices, but the information about the satellite controller devices is stored in memory 115 associated with a controller leader 410.

As with the device layout database, the controllers and modules may also be laid out in a manner such as shown in FIG. 4. Multiple controllers 405, 410 may be connected 425 through wired connections, wireless connections, or a combination of both. In some systems, a master controller (not shown) divides the work in the network between the controllers in the system using distributed system methods. In some systems, the satellite controllers are not given any work except that that concerns their own devices. In some systems, controllers 405 can be connected to one or more modules 415, which are themselves connected to devices 420. The devices 420 then connect to the controllers 405 through the modules 415.

Also stored in memory may be proposed device controller locations 155. Each controller has a certain number of wiring pins 160 that have devices 170 assigned to them. These assignment are accessible to the controller such as in e.g., a device layout database. The controller—device layouts may be input by a user using an I/O device 175 associated with the controller in any manner of ways. For example, when initially designing a building, a user may digitally input the desired devices into a digital version of the building, along with the devices wiring information. In some embodiments, common devices may have wiring and other electrical information already input into a database about them, so a user may just need to specify the manufacturer and specific type of the device. For devices not in the database, users may be able to input the necessary wiring information themselves. Once the digital devices are input into the digital building, a controller, a controller system, or another sort of computer system associated with the controller may then create the controller-device wiring layout, including the wiring locations for the devices within controllers. Users may be able to change these associated wiring layouts as needed. In some implementations, users may input how the devices fit into the controllers themselves. In some implementations, users may input some device locations within the controller system, while letting the controller system design other controller-device layouts. In some implementations, users may directly input the devices that are to be attached to controller wiring pins. Other methods known by those of skill in the art may be used, as well.

A reporting device 180 is also disclosed. In some embodiments, the reporting device reports on whether the wiring pin 160 has been attached to the correct device 170. This reporting device 180 may be any sort of indication that an event has occurred.

Figure 2:
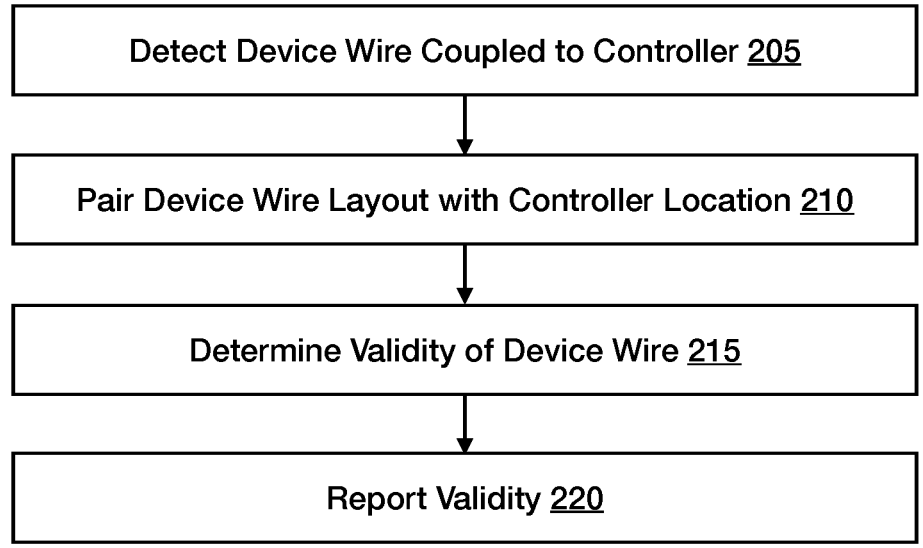
FIG. 2 is an exemplary flow diagram of illustrating some steps in some implementations of automated point mapping in conjunction with which some described embodiments can be implemented.

With reference to FIG. 2, a flowchart is shown that may be used in some systems and methods. Steps in an embodiment may also be done in a different order than the top-to-bottom order that is laid out in FIG. 2. Steps may be performed in parallel, serially, or in a partially overlapping manner. Steps may also be combined, omitted, renamed, regrouped, or otherwise depart from the illustrated flows, provided that the process performed is operable and conforms to at least one claim.

At 205, the controller detects that a device wire has been coupled to the controller at a controller location. The controller may be a single controller, or a distributed system of controllers, etc. These controller locations may be a wiring pin 160. The controller location may also be a wiring pin associated with a module 415. The controller location may be some other location where a device can be connected, possibly through an intermediary, to a controller. Because the controller (through, e.g., the device layout database) understands which device is connected to its wiring pins, it can determine which device will be expected to be attached to a given wiring pin. These wiring pins may be directly attached to a controller or may be attached to a module which is attached to the controller. (For more on modules, see FIGS. 3, 4, and 5 and the accompanying text.)

At 210, the controller determines which device, and possibly, which wire of which device (for a multi-wire device) should be attached to that wire. This may be done by pairing a device layout in the database with the location on the controller in the database that the unknown device has plugged into. At 215, the validity of the device wire is determined. The device layout database comprises information on how the device works, including wiring information. The controller can check the wire for such information as is necessary to determine if the correct device is at the other end of the wire-if the device is valid. Determining validity of the device may entail checking that the correct current is on the wire, the correct voltage is on the wire, the wire is following the expected protocol, a signal received on the device wire, a signal received on the device wire in response to a signal sent by the controller, etc. Other ways that may be used to determine if a device wire is valid includes using the device wire to turn the device on; checking if the correct voltage is running through the wire when the device is on; checking if the correct current is running though the wire when the device is on; checking if the correct power (current*voltage), etc. a device is detected a device layout is paired to a controller wiring pin. Because the controller (through, e.g., the device layout database) understands which device is connected to its wiring pins, it can determine which device will be expected to be attached to a given wiring pin. These wiring pins may be directly attached to a controller or may be attached to a module which is attached to the controller. (For more on modules, see FIGS. 3, 4, and 5 and the accompanying text.)

In some embodiments, the device layout database comprises a protocol associated with the device 170. This may be a protocol is used by the controller to speak to the device, and may be the protocol that the device uses to speak to the controller. These may be the same or different protocols. These protocols may be protocols that are well understood, or may be custom protocols that are input into the controller, specific for a given device.

At 220, the validity of the device wire is reported. This report may made in a dedicated reporting device 180, The reporting device may have a signal that indicates that the correct device has been attached to a wiring pin. The reporting device may have a signal that indicates that an incorrect device has been attached to a wiring pin. The reporting device may have a series of lights. The reporting device may be text that is displayed on an I/O device. The reporting device may be an indication that is displayed on an I/O device. The reporting device may be text that is displayed on an I/O device. A certain color light at the reporting device may signify that the correct device has been wired to the wiring pin. A different color may indicate that an incorrect device has been wired to the wiring pin. The reporting device may be a light associated with a wiring pin that lights up green when a correct device 170 is wired to a wiring pin 160. The reporting device may be light associated with a wiring in that lights up red when an incorrect device is wired to the wiring pin 160.

Figure 2A:
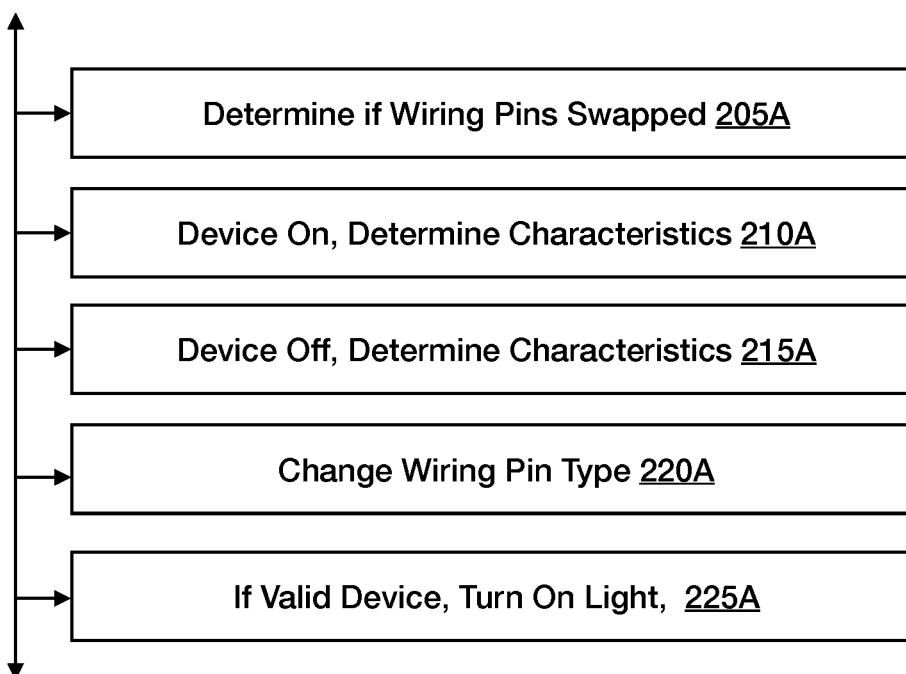
FIG. 2A is an exemplary diagram that describes controller-device interaction.

With reference to FIG. 2A, at 205A, in some embodiments, it is determined if connector pins are swapped on a device or among devices associated with a single module or among devices associated with a single controller. Because the controller understands the expected inputs from each of the connectors that are expected to be connected to it, if connector A is exhibiting the protocol of connector B, and vice-versa, the controller can determine that connector A and connector B have been swapped.

At 210A, in some embodiments, the controller turns a device on, using information from an information source, such as a device layout database. Once the device is on, the controller can send information along the device wire allowing the controller to determine characteristics of the device. These characteristics may be device-dependent, but may be used to determine if the correct device is coupled to the controller. At 215A, in some embodiments, the controller determines a device is off, using information from an information source, such as a device layout database. Once the device is determined to be off, the controller can check voltage, current, etc., of the device wire allowing the controller to determine characteristics of the device. These characteristics may be device-dependent, but may be used to determine if the correct device is coupled to the controller.

At 220A, in some embodiments, the controller changes wiring pin type 220A. Sometimes the controller and the type of the device connection (e.g., a wiring pin) do not match. In some embodiments, the wiring pin features are encoded in hardware and software, and/or encoded in software that can make hardware modifications such that the controller can change the pin to match that required by the device by modifying software associated with the pin. In some embodiments, the pin is associated with a module that itself is associated with the controller. In some embodiments, the controller gives software instructions to the module associated with the pin, which in turn, modifies its hardware to change the pin to the appropriate type. Encoding such sorts of hardware features in software is well-understood by those of skill in the art. Basically, a series of hardware features exist, and the software turns the needed ones on, and the ones that are not needed off, such that the wiring pin has the desired set of features. The type of protocol that the pin understands can also be changed in the database files associated the pin. In some embodiments, the controller has modules that the devices are wired to. These modules have circuit boards that can have specific features associated with the pins on the module turned on and off at the direction of the controller.

At 225A, if the device has been determined to be valid, a light associated with the wiring pin is turned on. In some embodiments, this light is green. In some embodiments, the light is a different color.

Figure 2B:
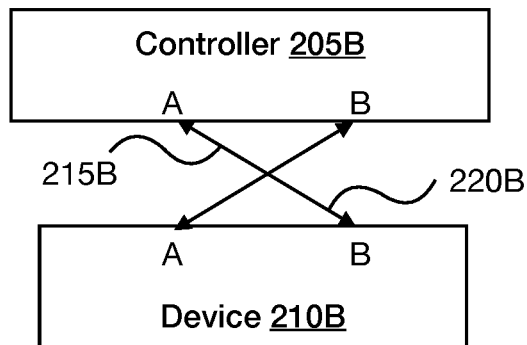
FIG. 2B is an exemplary diagram that further describes controller-device interaction.

FIG. 2B shows an example of a device 210B with wiring pins swapped on a controller 205B Device 210B is wired to a controller 205 with multiple wires 215B, 220B. As the controller understands the signals and current/voltage that are expected to be received on the wires, in some embodiments the controller can determine when the wiring has been swapped, that is, as shown in this example, device wire A was expected to be wired to controller wire A but instead has been wired to controller wire pin B, and vice versa. This also works for devices with more wires. In some embodiments, the controller can determine when a device A at wire A has instead been wired to controller location C. In some embodiments, when a device A is expected to be wired to locations A, B, and C, but is wired elsewhere within the controller, the controller will detect this and determine the correct location for the device.

Figure 3:
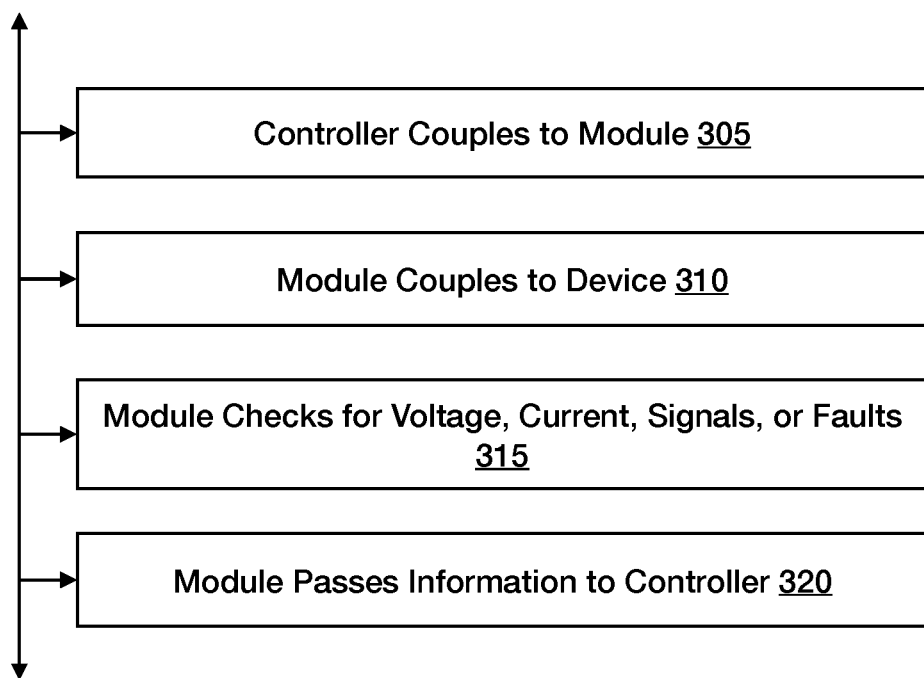
FIG. 3 is an exemplary diagram that further describes controller-module interaction.

With reference to FIG. 3, in some implementations the controller is operationally able to couple to a module 305, and the module is operationally able to couple to the device connector 310. In some implementations, the module then checks for at least one of voltage, current, signals, or faults 315. In some implementations, the module then passes the learned information (voltage, current, faults, signal) to the controller 320. The module provides a connection between the device connecter and the controller, such that information about the device (e.g., voltage, current, faults, etc.). In instances where the specific details about a connector/wiring pin needs to be changed (such as discussed above with reference to "a partial list of possible wiring pin features"), the hardware that controls pin behavior may reside on the module. The controller, in such instances, will determine which changes need to be made to the pin, and then pass information on to the module about how the module needs to make changes to itself.

An illustrative example of a controller—module hierarchy can be seen with reference to FIG. 4. At the top of the hierarchy is one or more controllers, such as the controller shown in FIG. 1 at 105. The controllers may be able to communicate 425 with other controllers 410 in a controller system using a wired connection, a wireless connection, or a combination of the two. A satellite controller may be a controller that is lacking some functionality. For example, a regular controller 405 may be able to hold 6 modules 415, while a satellite controller 410 may be able to hold 2 modules. Other possible differences may be that the satellite controller has less memory, 115, different computer hardware 110 such as processors, etc. As already mentioned, the controllers may hold a certain number of modules 415. These modules then connect to devices 420. The device 420 can be thought of connecting to the controllers 405, 410 through the module 415. Different controllers may hold different number of modules; different modules may hold different numbers of devices. Some modules may be able to accommodate six wiring terminals.

Figure 5:
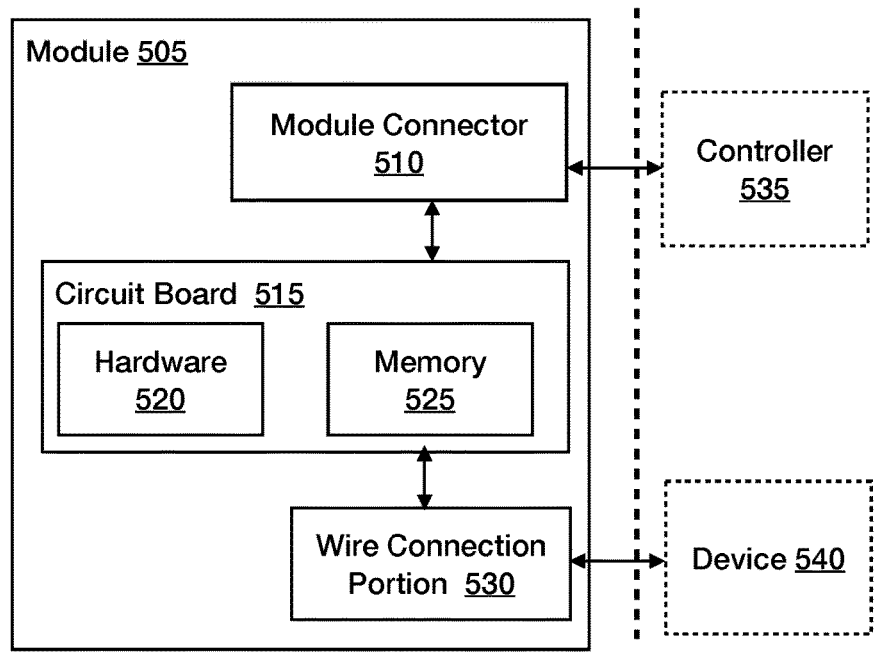
FIG. 5 describes some more details on some module implementations.

FIG. 5 describes some more details on some module implementations. In some implementations, the module 505 further comprises hardware that has the operational ability to determine a voltage, a current, or specific fault detection, which information it then passes to the controller. A controller 535 may send messages to a module connector 510. The module connector may then send those messages to its circuit board 515, which may then process the messages and make decisions using its hardware 520 and memory 525. This may result in an altered signal from the signal originally sent by the controller. This altered signal may then be passed to a device connection portion 530 (e.g., a wiring pin 160) which sends the signal to a device 540. This process may work the opposite way as well. A device 540 sends a message through a device connecter (wire connection portion) 530 to the circuit board 515, which may then process the message, changing the signal. The changed signal is then sent through the module connector 510 to the controller 535. In some embodiments, the signal is not changed from the controller 535 to the device 540. In some embodiments, the signal is not changed from the device 540 to the controller. In some embodiments, the circuit board 515 can change the nature of the device connecter 530 that is connecting to device 540 depending on the device 540's requirements. In some implementations, the module, using its circuit board, can determine the voltage, current, and/or fault on the device connector (wiring pin) 530 attached to device 540

A partial list of possible wiring pins 160 features that exist in hardware and can be changed to other features in software are shown below.

- Ground connection (through a FET)
- 24 VAC power connection (through a Triac)
- 0-10V DC analog voltage (via a DAC)
- Strong 1-wire pullup (via a FET)
- High-range voltage divider: don't know what will be plugged in, so anticipate highest tolerated (480 volt) if someone plugs in an unknown signal with unknown voltage measure first with high range ability, sees a really tiny signal, can switch to low range, measure small signal, can be safe the whole time.
- Low range voltage divider
- 4-20 mA current shunt
- 24 VAC current shunt
- DC offset injector that can measure both halves of an DC waveform
- Electromechanical relays, each relay having 3 connections (normally open, common, normally closed)

120 VAC outputs

Chips that measure current

A feature that a can switch 250 volt AC up to 10 amps

Control for high-current motors.

Figure 6:
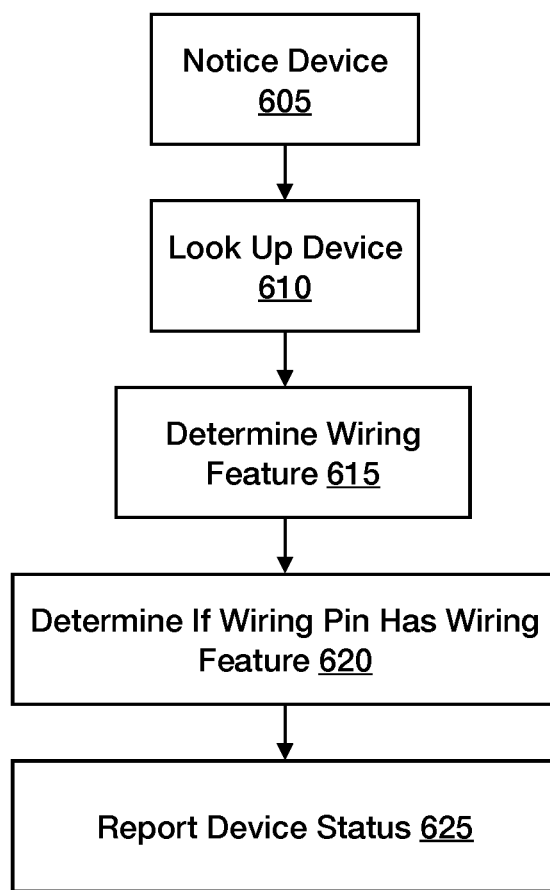
FIG. 6 is an exemplary flow diagram illustrating steps in some methods of automated point mapping with which some described embodiments may be implemented.

In FIG. 6 a flowchart is shown that may be used in some methods. Steps in an embodiment may also be done in a different order than the top-to-bottom order that is laid out in FIG. 6. Steps may be performed in parallel, serially, or in a partially overlapping manner. Steps may also be combined, omitted, renamed, regrouped, or otherwise depart from the illustrated flows, provided that the process performed is operable and conforms to at least one claim.

At 605, a controller (e.g., 105) notices that a device has been operably attached to a controller wiring pin. This device may have been attached directly to the controller, or may have been attached to a module that itself is attached to a controller (as seen with reference to e.g., FIGS. 4 and 5 and the accompanying text). At 610, the controller consults a device database to determine which device is supposed to be hooked up to that location. If a device has multiple connectors, the controller may look up each pin separately, may look the device up all at once, etc. At 615, the controller determines a wiring feature of the device. The controller may look this feature up in a device database separately, or may have looked it up initially when it was determined which device was to be hooked up to that location. At 620, the controller determines if the controller wiring pin has the feature(s) that were looked up. It determines its validity, that is, if it had the expected feature (or features) or not. This feature may be any sort of feature that can determine if the correct wire has been hooked up, such as if the correct voltage is on the wire, the correct current, if the correct protocol is being used, or a special set of signals may be sent to the device that causes the device to identify itself to the controller if it is the correct device. Other methods of detection may be used as well. If the feature is (or features are) present, or behave as expected, etc., then the device is valid. If the feature(s) are not present, or don't behave as expected, then the device is invalid.

At 625, whether the device passed or failed the line testing is reported using a reporting feature. This feature may be a signal. In some embodiments this might be light close to the wiring line that is being tested. It might turn red if the wrong wire is installed, and turn green if the correct wire is installed. In some embodiments the reporting feature may be a signal on a user interface screen associated with the controller, in some embodiments, the feature may be a report; in some embodiments, the feature may be a sound indicator, etc.

Figure 7:
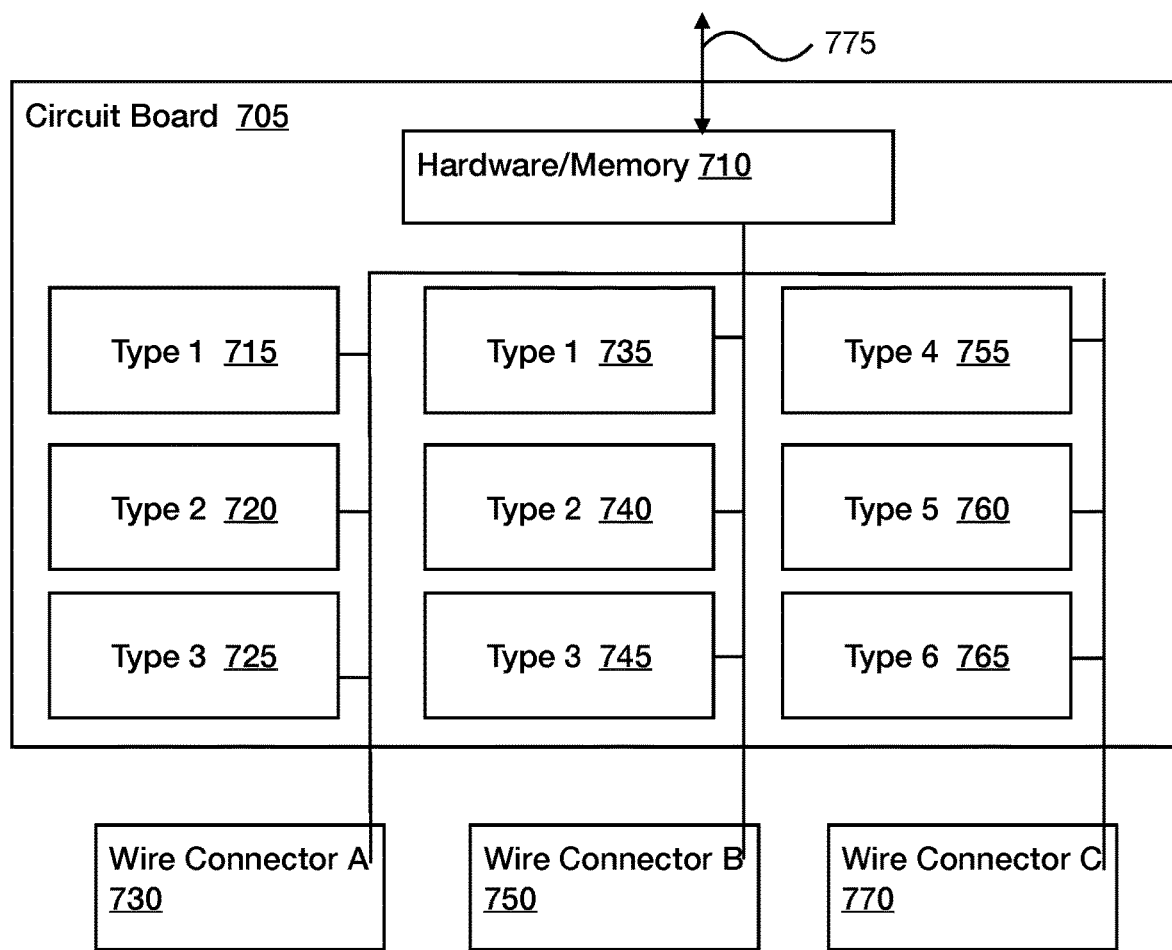
FIG. 7 is an exemplary diagram that describes module details with which some described embodiments may be implemented.

As shown with reference to FIG. 7, in some embodiments, a module can change the wiring pin type to match wiring type of the device. In some embodiments, the module has a circuit board 705 with hardware and memory 710. In the described module, there are three wire connectors, wire connector 1 730, wire connector 2 750, and wire connector 3 770. These wire connectors may be of different functions, e.g., type 1 through 6. A possible list of possible wiring pin connector types is shown elsewhere. The circuit board has hardware associated with the wire connectors that can be enabled by the module receiving the appropriate signal from the associated controller, allowing the wire connectors to be of one or more of those types. Wire connector A 730 has, associated it in the circuit board hardware for 6 types: Type 1 715, Type 2 720, and type 3 725. Wire connector B, similarly has the hardware potential to be one of the three types as well—Type 1 735, Type 2 740, and type 3 745. Wire connector C has different types associated with it: Type 4 755, Type 5 760, and type 6 765. The controller send a signal (or a program or another indication) to the module that wire connector A is expected to be type 3. The module may then be able to use its hardware/memory 710 on its circuit board to send a signal 775 telling a Wire Connector A to be of Type 3. The module may be able to connect wire connector type 3 725 to Wire connector A, making Wire connector A of type 3. In some embodiments a single wire connector may be multiple wire connector types; for example, wire connector A could be both type 2 720 and type 3 725.

Figure 8:
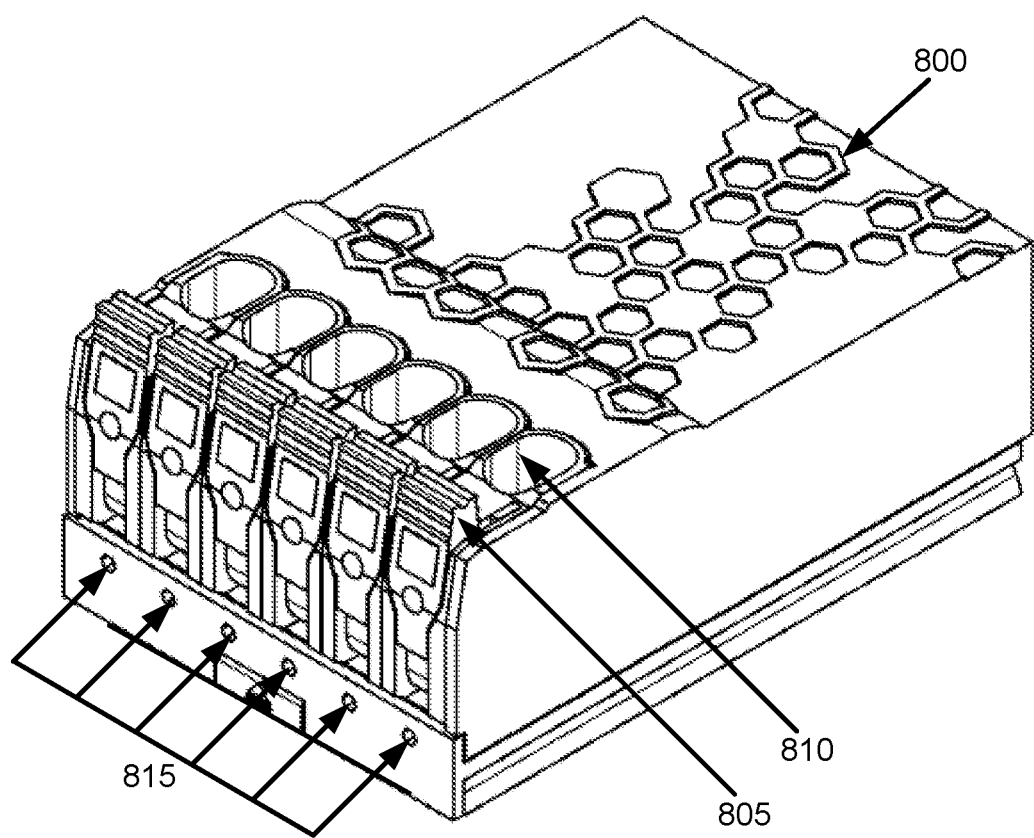
FIG. 8 is an exemplary diagram that further describes module details with which some described embodiments may be implemented.

FIG. 8 shows a module 800 that a may be used in systems and methods disclosed herein. Modules may built with wire connection portions (also known as wiring pins or points), which may be connectors, to connect wires from devices to the controller through the modules. Wire connection portions may be built with lever locks to lock a wire in place that will be connected to the module, and through the module wire connection portion, to a device. These wire connection portions may be connected by connector-, such as pogo pins, to the controller, which will pass information from the wire connected to the device, to the controller. In some embodiments, the wire connection portions comprise are tool-less lever lock connectors that securely connect almost any wire, from 10 to 26 gauge. The module 800 shows an embodiment with tool-less lever lock dry contacts 805, 810 With them, a level/lever 805 can be pulled down. A wire can then be inserted at 810. Pulling the level up will then pinch/secure the wire into the contact.

In this illustrative embodiment, wiring pins 810 have built-in line testing. When an installer pulls a wire and inserts it in the wire connection portion 810, software associated with the controller, the module, or a combination of the module and the controller will test and validate whether the pulled wire corresponds to the right wire in the model, and then indicate the correct correspondence in a visible way. In an illustrative embodiment, the module has LEDs positioned by the wires (or a selection of wires, or a single LED) that will indicate if the proper wire has been inserted, as shown at 815. In an embodiment, the LED flashes green if the proper wire has been pulled, or red if the wire is incorrect.

Figure 9:
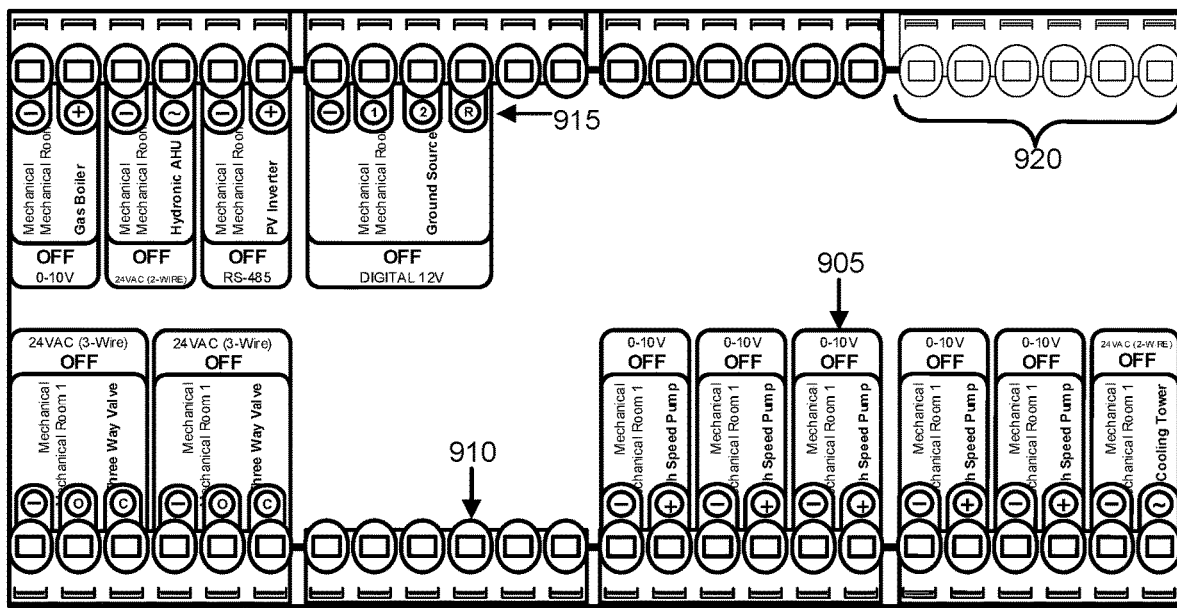
FIG. 9 is a block diagram of an exemplary computing environment in conjunction with which described embodiments can be implemented.

FIG. 9 shows an exemplary user interface with which devices can be added or modified by a controller or a system of controllers. The exemplary user interface shows the possible controller wiring connections 910 that devices can be hooked up to. In this embodiment, the display 900 shows a controller with eight modules 920 each of which have 6 wiring connections 910 where devices can be wired directly to the controller. Devices 905 can be moved into location on the controller display 90X). The individual aspects of the wiring connections 915 are also displayed. In some embodiments, devices can be moved, the specifics of the devices can be modified, including chaining the nature of the wiring connections 915.

Figure 10:
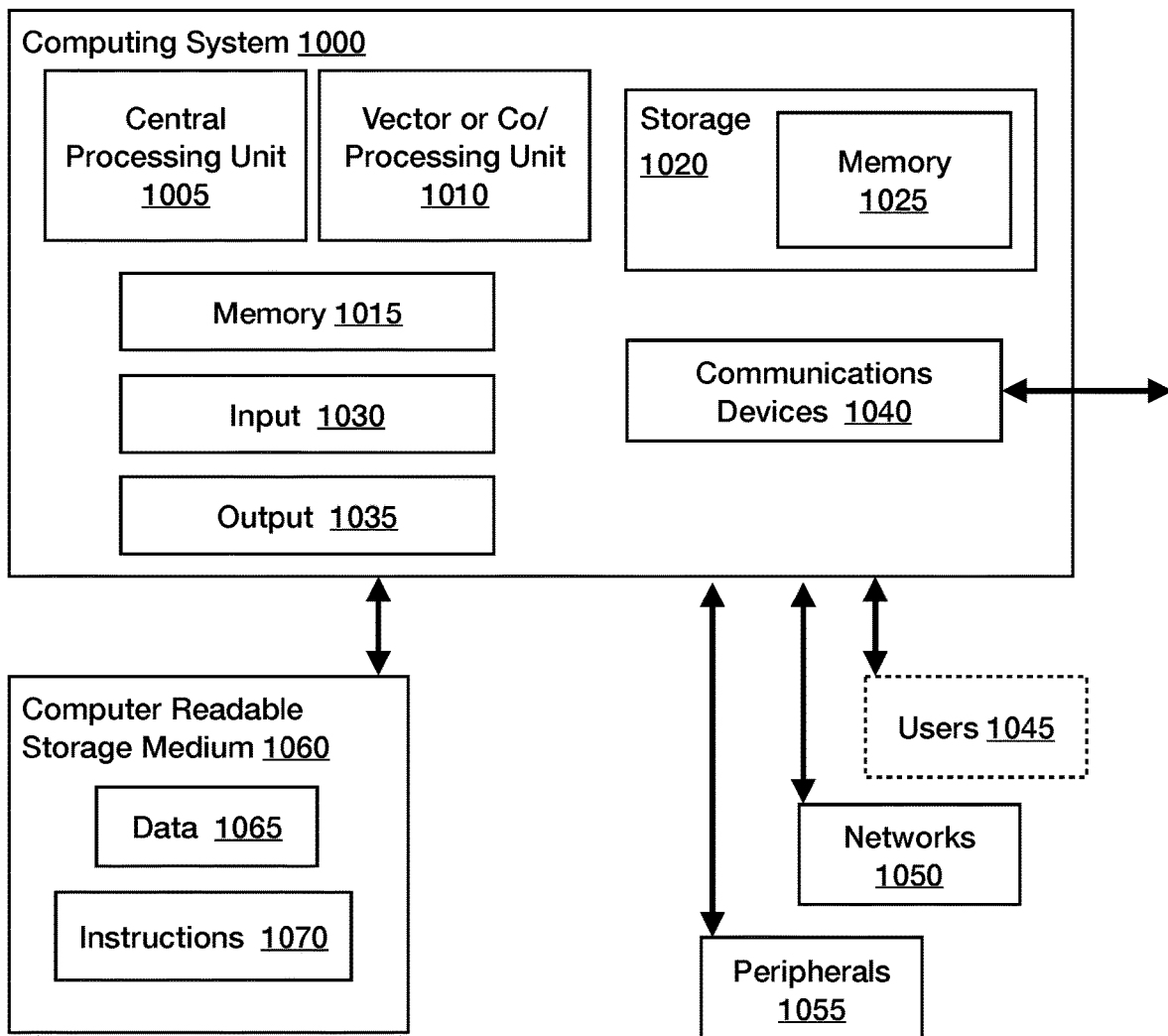
FIG. 10 shows some components that may be included in a computing environment with which described embodiments may be implemented.

FIG. 10 shows some components that may be included in a computing environment used in the systems and methods described herein. The computing environment (which may be a controller or a controller system) may include at least one central processing unit 1005 and memory 1015, 1025. The processing unit may execute computer-executable instructions and may be a real or a virtual processor. There might also be a vector or co/processing unit 1010 that enables fast vector processing. In a multi-processing system, multiple processing units execute computer-executable instructions to increase processing power. The memory 1015, 1025 may be volatile memory (e.g., registers, cache, RAM), non-volatile memory (e.g., ROM, EEPROM, flash memory, etc.), or some combination of the two. For example, the memory can be volatile memory, e.g., static memory cells, as in FPGAs and some CPLDs; or non-volatile memory, e.g., FLASH memory, as in some CPLDs, or in any other appropriate type of memory cell. The memory stores software implementing described techniques and tools. The computer system may be distributed, with multiple processors and associated memory in different locations that communicate using wired or wireless network connections. These distributed computing nodes may run simultaneously run the same program using distributed computing techniques.

A computing environment may have additional features. For example, the computing environment may include storage 1020 which may also include memory 1025, one or more input devices 1030, one or more output devices 1035, and one or more other communication devices 1040. These may include touch screens, keyboards, game controllers, touchpads, LED screens, voice-operated input systems, printers, phone connections, FAX machines, etc. An interconnection mechanism such as a bus, controller, or network interconnects the components of the computing environment. Typically, operating system software stored in memory 1015, 1025 provides an operating environment for other software executing in the computing environment, and coordinates activities of the components of the computing environment. The computer system 1000 may connect to other computer systems through network(s) 1050, which may be wired, wireless, or both. Peripherals 1055, such as external hard drives, modems, mice, keyboards, zip drives, scanners, 3-D printers, etc., may be included. Certain components may belong to more than one category.

The computing system 1000, like other suitable systems, also includes one or more computer-readable storage media 1060. Media 1060 may be of different physical types. The media 1060 may be volatile memory, non-volatile memory, fixed in place media, removable media, magnetic media, optical media, solid-state media, and/or of other types of physical durable storage media (as opposed to merely a propagated signal). In particular, a configured medium 1060 such as a portable (i.e., external) hard drive, CD, DVD, memory stick, or other removable non-volatile, non-transient memory medium may become functionally a technological part of the computer system when inserted or otherwise installed, making its content accessible for interaction with and use by central processing unit 1005. The removable configured medium 1060 is an example of a computer-readable storage medium 1060. Some other examples of computer-readable storage media 1060 include built-in RAM, ROM, hard disks, and other memory storage devices which are not readily removable by users 1045. A computer-readable medium should not be considered a signal; neither should a computer-readable memory be considered a signal.

Figure 11:
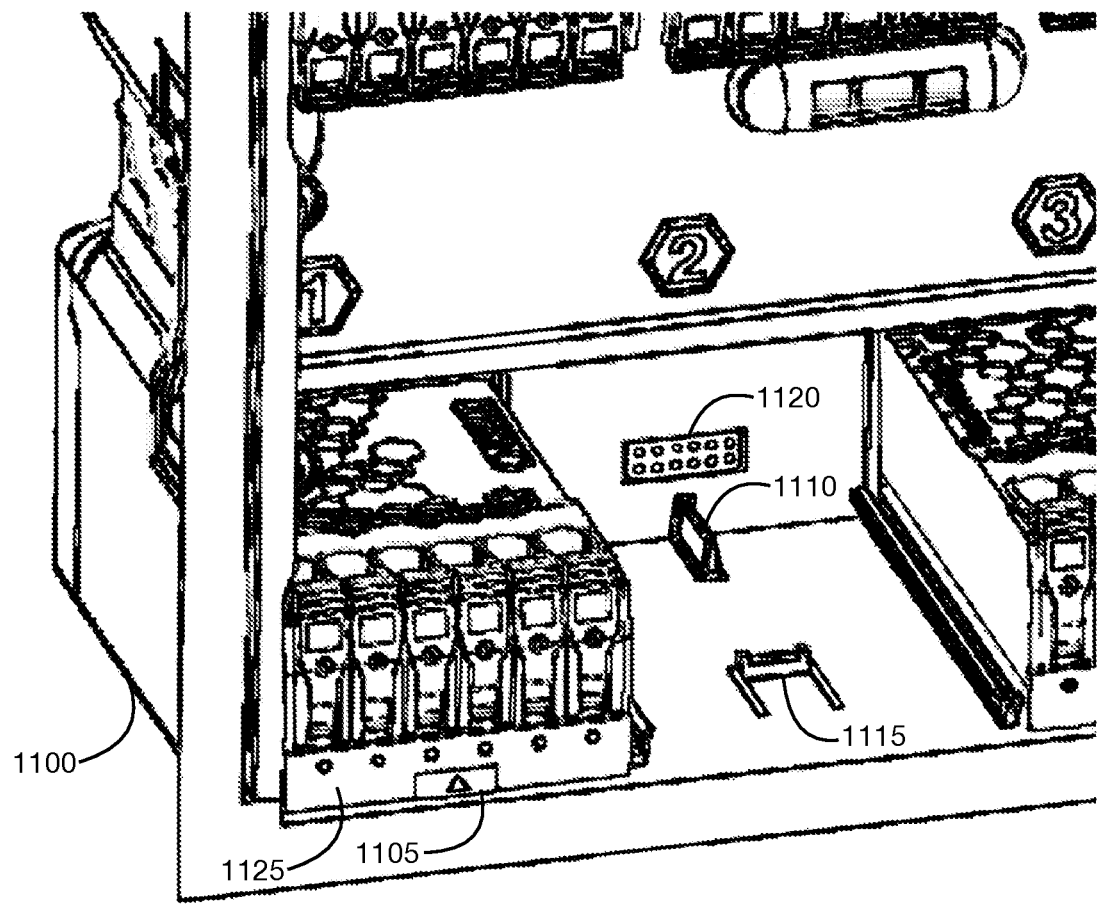
FIG. 11 shows a partial isometric view of an example controller with installed modules.
Figure 12A:
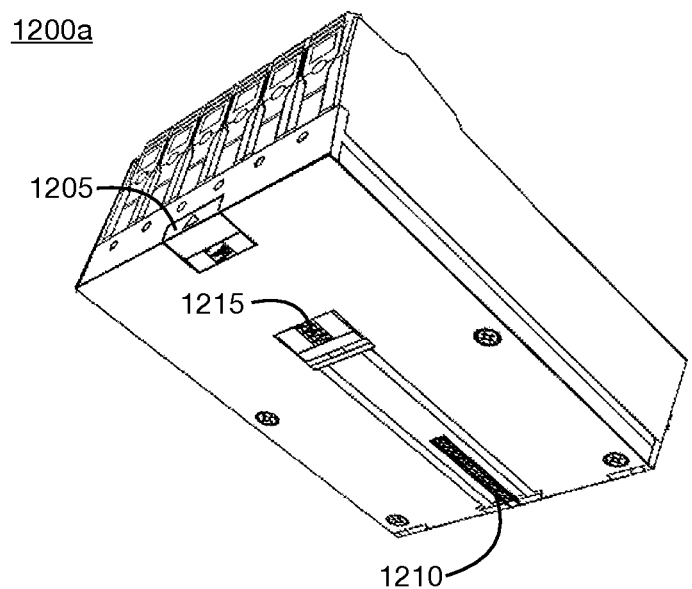
FIG. 12A shows a bottom isometric view of an example module.
Figure 12B:
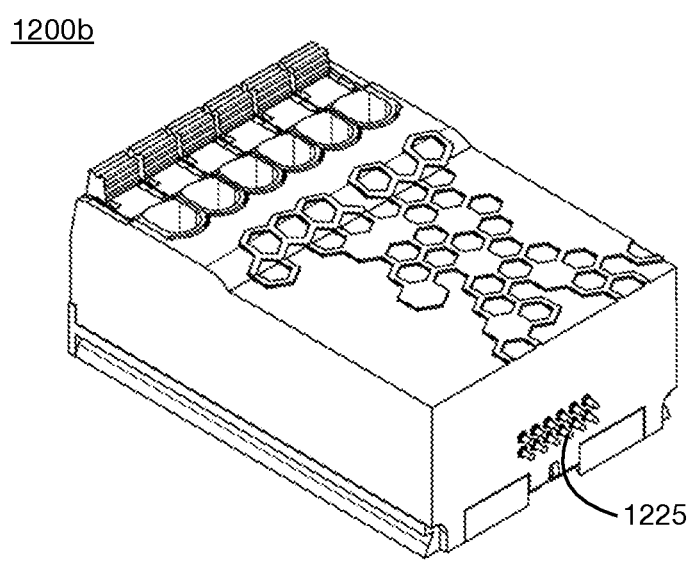
FIG. 12B shows a top isometric view of the example module.

With reference to FIGS. 11 and 12A-B, an example mounting system is shown. A controller 1100 with spring release mechanism that attaches to the modules is shown. When a module 1125, 1200a, 1200b is slid into the controller 1100, there are two springs that become loaded, a front spring 1215 and a back spring 1210. When the module slides in, the module catches on the hook tab 1115, and loads the front spring 1215 and the ejector button 1105. At this time, the back spring 1210 also becomes loaded by the bar 1110. The bar 1110 pushes the spring 1210 as the module 1200 is pushed into place. When the module ejector button 1105, 1205 is pushed, it moves the hook tab 1115 out of the way, and the force from the back spring 1210 pushes the module 1125, 1200a, 1200b out of the box. Pogo pins 1225 that attach the module to the controller are shown. These connectors connect the module 1125 to the controller 1100 via connector targets 1120, allowing messages to be passed and received between the controller 1100 and a resource attached to it though the module 1125, 1200. Twelve pins are shown here, but different numbers of pins can be used. The connectors from the modules 1125, 1200a, 1200b interface with the connector targets 1120 on the controller; these might directly connect to a controller motherboard (including the processor and memory), or might connect indirectly to the controller motherboard. With reference to FIG. 12B, the corresponding module connectors (pogo connectors) 1225 are shown on the module 1200b.

With continuing reference to FIG. 12A, the corresponding structures on the module 1125 shown on FIG. 11 are shown. The module structure that catches on the controller hook tab 1115 is shown, as well as the springs 1215, 1210 that are loaded by the ejector button 1105 when the ejector button is pushed into place in the controller. At 1205 another view of the ejector button is shown.

The medium 1060 is configured with instructions 1070 that are executable by a central processing unit 1005; "executable" is used broadly to include, human readable source code, such as Java or C++, compiled code, and/or machine code. Executable code also includes code that a runs using a distributed system, such as a series of controllers and controllers that distribute and run complex problems. The medium 1060 is also configured with data 1065 which is created, modified, referenced, and/or otherwise used for technical effect by execution of the instructions 1070. The instructions 1070 and the data 1065 configure the memory or other storage medium 1060 in which they reside; when that memory or other computer readable storage medium is a functional part of a given computer system, the computer system may be configured by the instructions 1070 and data 1065.

Although an embodiment may be described as being implemented as software instructions executed by one or more processors in a computing device (e.g., general purpose computer, cell phone, or controller), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

We claim:

1. A wiring module for a building controller, comprising:
a frame;
a circuit board disposed on the frame;
a plurality of resource connectors mounted on the frame, the resource connectors configured to attach a resource wire;
a plurality of module connectors mounted on the frame, the plurality of module connectors configured to operably connect the resource wire to the controller, the resource operationally able to be controlled by the controller;
a mounting system configured to slidably mount the wiring module to the controller; and
an indicator disposed on the frame, the indicator configured to receive a communication from the controller that a wire attached by the resource connectors to the frame is determined by the controller to be a correct wire.

2. The wiring module of claim 1, wherein hardware disposed on the circuit board is operationally able to modify information passed to a resource attached to a resource connector.

3. The wiring module of claim 2, wherein the hardware disposed on the circuit board is operationally able to provide a plurality of functions.

4. The wiring module of claim 3, wherein the plurality of functions comprise ac motor control, dimmable lighting, real-time current monitoring, real-time voltage monitoring, overcurrent protection, torque protection, or tachometer feedback.

5. The wiring module of claim 1, wherein the indicator disposed on the frame is an LED.

6. The wiring module of claim 5, wherein the LED turns green when the communication from the controller indicates that the wire attached by the resource connector of the frame is determined by the controller to be a correct wire.

7. The wiring module of claim 1, wherein the building controller has a moveable display, and wherein the controller is operably configured to display, on the moveable display, the indicator.

8. The wiring module of claim 7, wherein the moveable display is operably able to allow a user to tell the building controller an expected resource layout of the wiring module.

9. A method, comprising:
detecting a wire associated with a resource at a resource connector operably attached to a controller with a processor and memory;
determining a desired resource at the resource connector stored in the memory;
determining a desired resource wiring parameter state stored in the memory;
testing the wire to determine state of the wire; and
turning on an indicator attached to the controller that indicates whether state of the desired resource wiring parameter matches state of the wire.

10. The method of claim 9, wherein the controller comprises a module operably attached to the controller.

11. The method of claim 10, wherein when the state of the desired resource wiring parameter matches state of the wire then turning on a "yes" indication on the indicator.

12. The method of claim 11, wherein the "yes" indication is a green LED.

13. The method of claim 11, wherein determining a state of the wire comprises detecting voltage of the wire.

14. The method of claim 13, wherein determining the state of the wire further comprises detecting current of the wire.

15. The method of claim 10, further comprising the resource connector operably attached to a module, wherein the module is operably attached to the controller through a module connector, and wherein detecting a wire at a resource connector further comprises the controller connecting to the resource connector through the module connector.

16. The method of claim 10, wherein the indicator is operably attached to the module.

17. The method of claim 10 wherein the controller sends a signal down the wire to the resource and receives a signal from the wire.

18. The method of claim 17, further comprising determining a desired resource protocol and wherein testing the wire to determine state of the wire further comprises determining if the signal from the wire matches the desired resource protocol.

19. A wiring module for a designated space controller, comprising:
a frame;
a circuit board disposed on the frame;
a resource connector mounted on the frame, the resource connector configured to attach a resource wire;
a module connector mounted on the frame, the module connector configured to operably connect the resource wire to the designated space controller, the resource operationally able to be controlled by the designated space controller;
an indicator disposed on the frame, the indicator configured to receive a communication from the controller that a resource wire is determined by the designated space controller to be a correct wire; and
a mounting system configured to slidably mount the wiring module to the designated space controller, the mounting system comprising a back spring, a front spring, and an ejector button, wherein the back spring and the front spring are loaded by the ejector button when the ejector button is pushed into place in the designated space controller.

20. The wiring module of claim 19, wherein the resource connector is a tool-less lever lock dry contact connector.

* * * * *